US011296926B1

(12) United States Patent
Henderson et al.

(10) Patent No.: US 11,296,926 B1
(45) Date of Patent: Apr. 5, 2022

(54) SYSTEMS AND METHODS FOR RANKED VISUALIZATION OF EVENTS

(71) Applicant: ServiceNow, Inc., Santa Clara, CA (US)

(72) Inventors: Lisa Sherilyn Henderson, Temecula, CA (US); Betsy Cherian, Poway, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/143,930

(22) Filed: Jan. 7, 2021

(51) Int. Cl.
*H04L 12/24* (2006.01)
*H04L 29/08* (2006.01)
*H04L 41/069* (2022.01)
*H04L 67/75* (2022.01)

(52) U.S. Cl.
CPC .......... *H04L 41/069* (2013.01); *H04L 67/36* (2013.01)

(58) Field of Classification Search
None
See application file for complete search history.

(56) References Cited

U.S. PATENT DOCUMENTS

| | | | |
|---|---|---|---|
| 6,321,229 B1 | 11/2001 | Goldman | |
| 6,609,122 B1 | 8/2003 | Ensor | |
| 7,020,706 B2 | 3/2006 | Cates | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidar | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,151,261 B2 | 4/2012 | Sirota | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,646,093 B2 | 2/2014 | Myers | |
| 8,674,992 B2 | 3/2014 | Poston | |

(Continued)

*Primary Examiner* — Ranodhi Serrao
(74) *Attorney, Agent, or Firm* — Fletcher Yoder PC (57) ABSTRACT

The present disclosure relates to a timeline visualization to enable users to more quickly find information and limit the amount of displayed information associated with one or more records. The timeline visualization displays events associated with a record as areas that are positioned along the timeline visualization. In some embodiments, the events displayed on the timeline visualization may be selected based on properties of the events and timeline parameters, such as dimensions of the timeline visualization and the areas to be displayed using the timeline visualization.

20 Claims, 7 Drawing Sheets

(56) References Cited

U.S. PATENT DOCUMENTS

| | | | |
|---|---|---|---|
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 10,853,380 B1* | 12/2020 | Agnew | G06F 16/248 |
| 10,861,202 B1* | 12/2020 | Agnew | G06F 16/904 |
| 2013/0086501 A1* | 4/2013 | Chow | G06F 16/2477 |
| | | | 715/772 |
| 2017/0032550 A1* | 2/2017 | Vander Broek | G06Q 30/0201 |
| 2017/0083585 A1* | 3/2017 | Chen | G06F 11/323 |
| 2018/0095621 A1* | 4/2018 | Ryan | G06T 11/206 |
| 2020/0019549 A1* | 1/2020 | Agnew | G06F 16/2264 |
| 2020/0026634 A1* | 1/2020 | Chen | G06F 11/3409 |

\* cited by examiner

| | | | | |
|---|---|---|---|---|
| TIMELINE RULES | NEW | SEARCH | TABLE ▽ | SEARCH |

ALL

| | LABEL | | COLOR | | CONTAINING | | |
|---|---|---|---|---|
| SEARCH | SEARCH | SEARCH | | |
| URGENCY CHANGED | #05740 | URGENCY CHANGE | 400 | VULNERABILITY GROUP [sn_vul_vulnerability] |
| WORK NOTE | #8165A1 | | 1,000 | VULNERABILITY GROUP [sn_vul_vulnerability] |
| DEFERRED | #6AABA7 | RE-OPEN ON | 100 | VULNERABILITY GROUP [sn_vul_vulnerability] |
| STATE CHANGED | #590173 | STATE CHANGED TO | 500 | VULNERABILITY GROUP [sn_vul_vulnerability] |
| EXPLOIT FOUND | red | EXPLOIT FOUND | 100 | VULNERABILITY GROUP [sn_vul_vulnerability] |
| MAXIMUM SIZE REACHED | #590173 | MAXIMUM SIZE REACHED | 100 | VULNERABILITY GROUP [sn_vul_vulnerability] |
| RESOLVED BY CHANGE | #0E84AD | "RESOLVED" STATE BECAUSE ALL THE CURRENT... | 200 | VULNERABILITY GROUP [sn_vul_vulnerability] |
| CHANGE CANCELLED | #0E84AD | ALL ASSOCIATED CHANGE REQUESTS ARE NOW C... | 100 | VULNERABILITY GROUP [sn_vul_vulnerability] |
| PRIORITY: MEDIUM | #84BF87 | PRIORITY: MEDIUM | 10 | VULNERABILITY GROUP [sn_vul_vulnerability] |
| DEFERRAL REQUESTED | #401C48 | DEFER | 300 | VULNERABILITY GROUP [sn_vul_vulnerability] |
| CHANGE CREATED | #1A5941 | CHANGE REQUEST | 100 | VULNERABILITY GROUP [sn_vul_vulnerability] |

FIG. 7

SYSTEMS AND METHODS FOR RANKED VISUALIZATION OF EVENTS

BACKGROUND

The present disclosure relates generally to providing a timeline visualization of events related to a record based on criteria associated with the events and parameters associated with the timeline visualization.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

As part of performing these core functions, enterprises and other organizations may utilize certain techniques for tracking updates to tasks being performed by the enterprise. As the updates to these tasks may come from multiple sources (e.g., employees, departments, auto-generated updates), it may be difficult to parse the updates to determine which updates may require more attention.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Accordingly, the timeline visualization discussed herein may enable users to more quickly find information and limit the amount of displayed information associated with the record. For example, the timeline visualization may receive events associated with a record, such as in response to receive an indication to access a record, a record history of the record, or otherwise indicate that the timeline visualization should be generated. To generate the timeline visualization, a suitable processing device may access events associated with the record and timeline parameters that indicate a size of the timeline, dimensions of areas to be displayed on the timeline, what type of events should be displayed on the timeline visualization, and the like. The timeline visualization may illustrate to a user events associated with a record, and the events are represented as areas located at (e.g., centered at) positions on the timeline visualization. Different events or types of events may be color-coded (or otherwise visually distinguished) to allow a reviewer at a glance to identify where in a time-line certain events or types of events occurred. In some embodiments, the timeline visualization may include timeline parameters, such as the dimensions of the areas corresponding to the events, the dimensions of the timeline, and ranking criteria (e.g., a severity of the event) that limits the type of events that may be displayed as areas on the timeline visualization. In some embodiments, the timeline visualization may indicate patterns between certain events that may be used to inform a user of whether certain tasks are pending or are completed. In this way, generating a timeline visualization that displays areas corresponding to events and fixing certain timeline parameters may improve the efficiency of users managing records.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

One or more users working for an enterprise or other organizations may manage and/or monitor records associated with tasks performed within the enterprise or other organizations. Each record may include a record history that stores and displays events that have occurred and relate to the record. In general, an event may include work notes (e.g., indicating a change or update made to a record, an indication of a task being completed), comments, an audit history, or other text or data (e.g., in either free-form or defined fields) indicating updates related to the record. For example, a record relating to a customer service case may include events such as whether or not a customer service representative has called a customer back, a date corresponding to when the customer service case was opened, a resolution status of the customer service case, a summary of the case (e.g., a comment), and the like. As another non-limiting example, a record relating to a software file may include events such as change requests, commits, approvals, merges, and the like. As another non-limiting example, a record relating to vulnerability groups may include events such an urgency change, a maximum size reached, a resolution status, and the like. In any case, the events may be generated in response to a task being completed (e.g., automatically or by a user after completing or performing the task) and/or submitted by a user using a free-form or selectable field. Certain techniques for presenting (e.g., displaying) a record history may include listing the information in a tabular format or a journal format whereby events may display text-descriptions for each event. However, as events are added over time to the journal or tabular format, it become increasingly difficult for the user to determine a status of the record as well as certain tasks.

Accordingly, the present disclosure generally relates to generating a timeline visualization to enable users to more quickly find information and limit the amount of displayed information associated with the record. For example, the timeline visualization may illustrate to a user events associated with a record, and the events are represented as areas located at (e.g., centered at) positions on the timeline visualization. Different events or types of events may be color-coded (or otherwise visually distinguished) to allow a reviewer at a glance to identify where in a time-line certain events or types of events occurred. In some embodiments, the timeline visualization may include timeline parameters, such as the dimensions of the areas corresponding to the events, the dimensions of the timeline, and ranking criteria (e.g., a severity of the event) that limits the type of events that may be displayed as areas on the timeline visualization. In some embodiments, the timeline visualization may indicate patterns between certain events that may be used to inform a user of whether certain tasks are pending or are completed. In this way, generating a timeline visualization that displays areas corresponding to events and fixing certain timeline parameters may improve the efficiency of users managing records.

Figure 1:
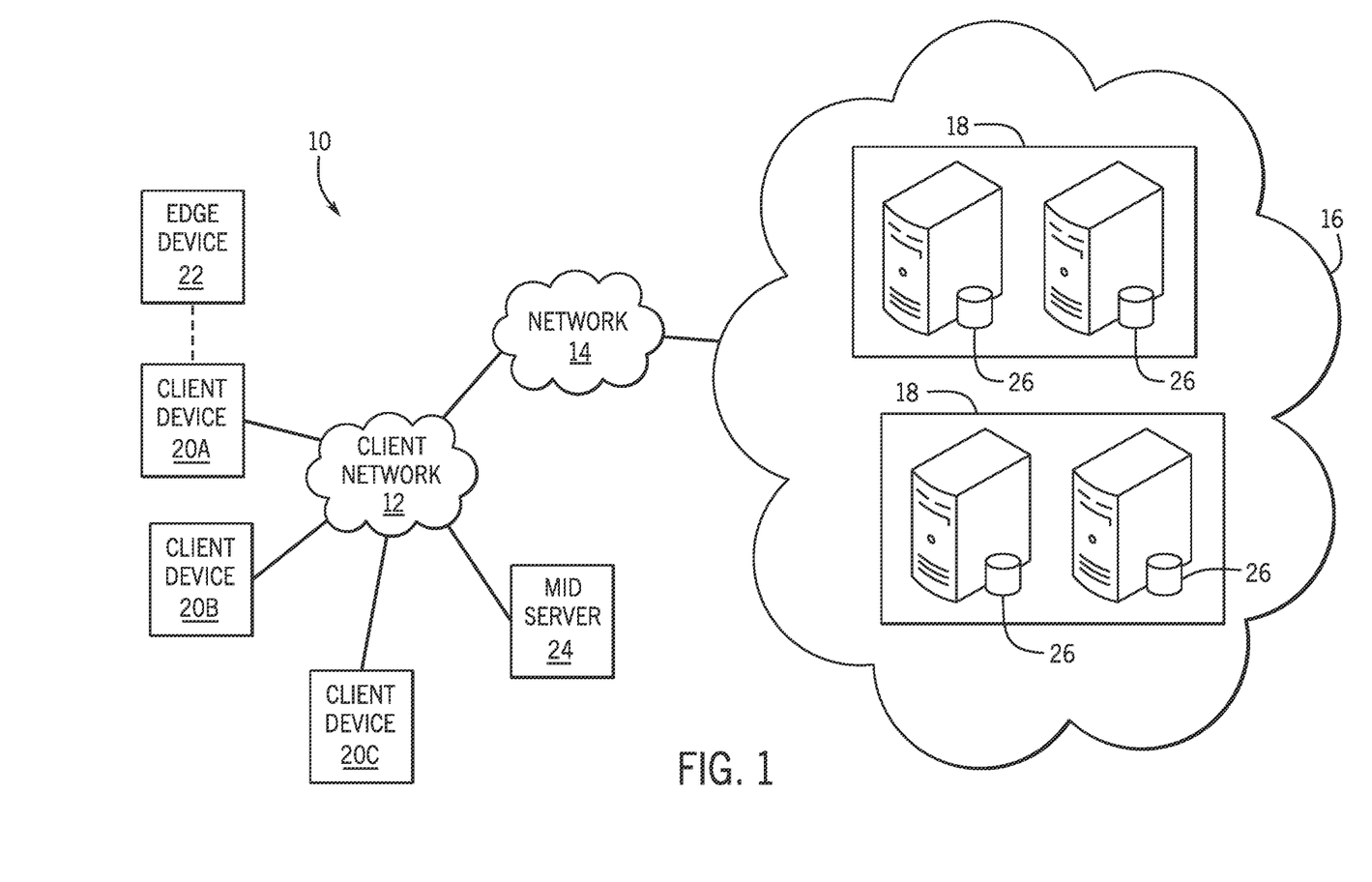
FIG. 1 is a block diagram of an embodiment of a multi-instance cloud architecture in which embodiments of the present disclosure may operate.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
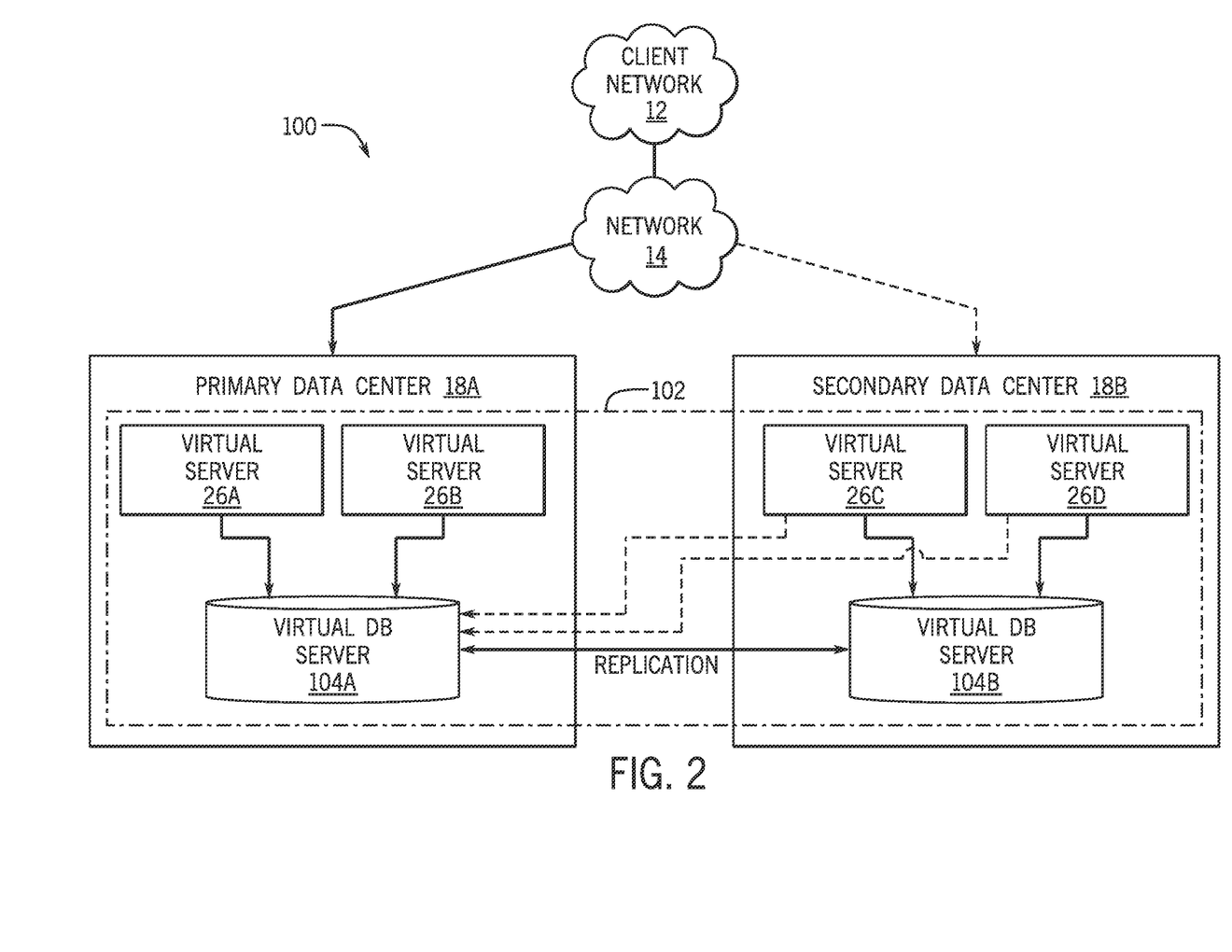
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
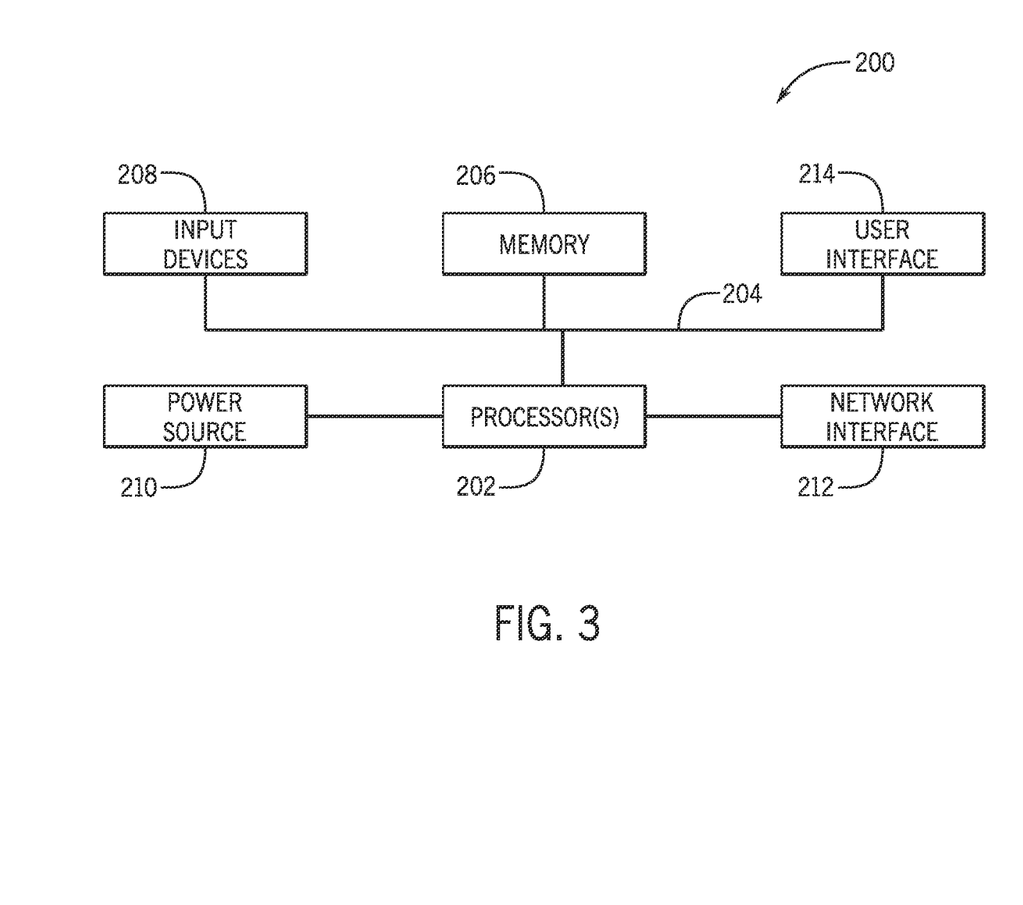
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
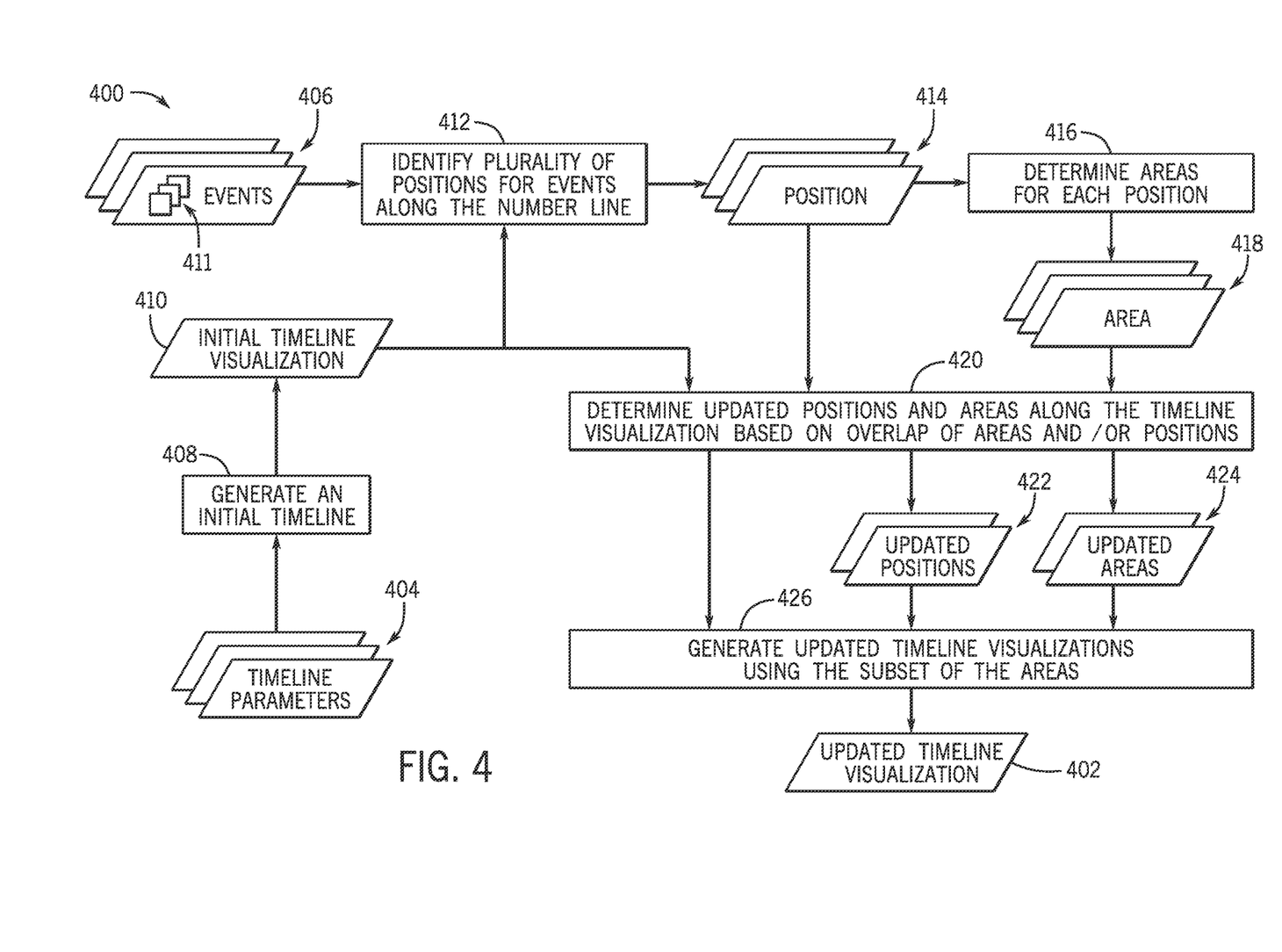
FIG. 4 is a flow diagram of an embodiment of a process to generate an updated timeline visualization for a record based on timeline parameters and events associated with the record, in accordance with aspects of the present disclosure.

As discussed herein, the disclosed timeline visualization may enable users to more efficiently track events associated with records by reducing, simplifying, and/or filtering the information presented to the user. For example, FIG. 4 is a flow diagram of an embodiment of a process 400 to generate an updated timeline visualization 402 for a record based on timeline parameters 404 and events 406 associated with the record, in accordance with aspects of the present disclosure. The steps illustrated in the process 400 are meant to facilitate discussion and are not intended to limit the scope of this disclosure, because additional steps may be performed, certain steps may be omitted, and the illustrated steps may be performed in an alternative order or in parallel, where appropriate. The process 400 may be implemented by a client device 20 or a device or server in communication with such a device 20. In some embodiments, the process 400 may be implemented using a processor of the data center 18 by way of the client device 20. For example, the processor of the client device 20 may interact with the processor of the datacenter using the network 14 and retrieve events 406 stored in a database (e.g., the database 104).

To start the process 400, the client device (i.e., the processor 202 of the client device 20) may receive one or more timeline parameters 402. In general, the timeline parameters are properties used to generate a timeline visualization (e.g., the updated timeline visualization 402). For example, the timeline parameters may include a maximum size of the timeline visualization (e.g., bytes, pixels, physical dimensions) that may be fixed (e.g., a number of pixels) or relative (e.g., based on a display resolution, a ratio of the area to the maximum size of the timeline visualization), a maximum gap size between events represented by areas along the timeline visualization, a minimum gap size, a maximum area, a minimum area, a maximum time range parameters that indicate a time range of the events 406 that may be displayed on the timeline visualization, as discussed in more detail below. In some embodiments, the timeline parameters 402 may be provided as input by a user (e.g., after the user submits a request to generate the timeline visualization) or accessed from a memory (e.g., memory 206) that may store predetermined timeline parameters provided by a user during a setup of an application configured to generate the timeline visualization.

After receiving the timeline parameters (404), a processor 202 of the client device 20 (or a device in communication with the client device 20) may generate (block 408) an initial timeline visualization 410. In general, the initial timeline visualization 410 may be an electronic file that stores the one or more timeline parameters 404. The timeline visualization 410 may include multiple positions corresponding to a time or time range. In some embodiments, the initial timeline visualization 410 may be displayed on a device (e.g., the client device 20). In any case, the initial timeline visualization includes data indicative of the timeline parameters such as the maximum size, the maximum gap size, the time range parameters, a minimum ranking of an event to be present on the timeline, and the like discussed above. In some embodiments, the process 400 may skip block 408 and proceed to block 412 with the timeline parameters 404 provided as input to block 412. That is, the processor 202 may not generate an initial timeline visualization, and instead, the processor 202 may use the timeline parameters 404 and the updated positions 422 and/or updated areas 424, as discussed in more detail below, to generate a timeline visualization (e.g., the updated timeline visualization 402).

At block 412, the processor 202 may access or receive the events 406 associated with the record and identify positions 414 for the events 406 along the timeline visualization 410. In general, the processor 202 may determine the positions 414 by arranging the events 406 chronologically. For example, each position along the timeline visualization 402 may correspond to a 15-minute time range (e.g., a first position along the timeline may correspond to a time range between 9:00-9:14 A.M., a second position correspond to a time range between 9:15-9:29 A.M., a third position correspond to a time range between 9:30-10:59 A.M.) Moreover, each event 406 may have a corresponding time (e.g., a timestamp). As such, the processor 202 may identify the first position for a first event that occurred at 9:00 A.M., and the processor 202 may identify the third position for a second event that occurred at 9:35 A.M.). In general, properties 411 (e.g., a time corresponding to the event 406) of the events 406 may be indicated in metadata of the event 406 or stored as a field in a table or record associated with the event 406. In some embodiments, the times or time ranges indicated by the timeline parameters 404 may be predefined (e.g., stored in a memory and accessed by the processor 202 in response to receiving a request to generate the timeline visualization), provided as input by a user, determined based on a date corresponding to the creation of the record (e.g., each time range may be correspond to a percentage of the lifetime of the record, such as 0.1%, 0.5%, 1%, 2%, 5%, 10%), or otherwise determined based on the properties of the record.

In some embodiments the processor 202 may identify the positions for the events 406 by arranging the events 406 chronologically based on the time range parameters indicated by the timeline visualization 410 and/or timeline parameters 404. For example, the time range parameters may indicate that the number of positions available for events should be given unequal weightings based on the time associated with each event 406. For example, the time range parameters may indicate that events 406 corresponding to a first time range of 6 P.M.-8 A.M. be allotted fewer available positions than events 406 corresponding to a second time range of 9 A.M.-5 P.M. As such, each position 414 may be non-linear with respect to time, and thus a number of available positions corresponding to the first time range may be compressed relative to a number of available positions corresponding to the second time range. For example, each position along the time line may correspond to a 15-minute time range (e.g., a first position along the timeline may correspond to a time range between 8:00-8:59 A.M., a second position correspond to a time range between 9:00-9:10 A.M., a third position correspond to a time range between 9:11-9:20 A.M.) In some embodiments, the difference in weightings may be visually indicated on the timeline visualization, such as by shading or coloring the positions corresponding different weights. In this way, by giving more weight (e.g., a number of available positions) to events that occur within certain time ranges, the timeline parameter may display or visually emphasize events that are more relevant to the user.

In some embodiments, the processor 202 may identify the positions 414 for the events 406 along the timeline visualization based on a match between the properties 411 of the events and the timeline parameters 404. For example, the timeline parameters 404 may specify a minimum or maximum risk score represented as a numerical value. In such an example, the processor 202 may identify events 406 having a risk score (e.g., the property 411) that is greater than or equal to the minimum score and the processor 202 may identify positions 414 for the identified events 406. As another non-limiting example, the timeline parameters 404 may indicate a type of the event, such relating to changes made to a software file. As such, the processor 202 may identify events having a property 411 that corresponds to changes made to a software file, such as merges, change requests, and the like. In this way, the user may, based on assessed or measured risk, filter out events 406 that the user may not desire to display on the timeline visualization (e.g., the updated timeline visualization 402) to generate updated events, and the updated events may be used to generate the timeline visualization 402.

At block 416, the processor 202 may determine areas 418 for each position. In general, the areas may be indicated by the timeline parameters 404. For example, the timeline parameters may specify dimensions for an area 418 along the timeline visualization. As such, the processor 202 may assign an area of or in a visual or displayed representation of the timeline in accordance with the specified dimensions for each position 414.

Using the positions 414 determined at block 412, the areas 418 determined at block 416, and the timeline parameters 404 (e.g., which may be indicated by the timeline visualization 410), the processor 202 may determine (block 420) updated positions 422 and updated areas 424 along the timeline visualization 410 based on an overlap of the areas 418 and/or the positions 414. In some embodiments, the updated positions 422 and updated areas 424 may be a subset of the positions 414 and a subset of the areas 418. For example, the processor 202 may determine that a first area at a first position overlaps with a second area at a second position. As such, the processor 202 may remove the second area at the second position or the first area at the first positions such that the updated positions 422 do not include the second position or the first position and the updated areas 424 do not include second position or the second area. In some embodiments, the processor 202 may determine which area 418 and position 414 to remove based on the time corresponding to the area 418 and the position 414. For example, and continuing with the example above, the processor 202 may remove the second area and the second position to generate the updated positions 422 and the updated areas 424 if a time corresponding to the second area and the second position occurred before a time corresponding to the first area and the first position.

Additionally, or alternatively, the processor 202 may determine updated positions 422 and updated areas 424 based on properties 411 of the events 406. The properties 411 may include ranking criteria, text descriptions of the events 406, keywords within the text descriptions, a type of the event (e.g., a comment, a change request, a work note). For example, the properties may include ranking criteria associated with the events 406. In general, the ranking criteria may indicate a severity or importance of the event. For example, the processor 202 may determine that a first area at a first position overlaps with a second area at a second position. After determining that the first area and the second area overlaps, the processor 202 may determine a ranking criteria associated with the events corresponding to the first area and the second area. If the processor determined that the ranking criteria associated with the first area is greater than the ranking criteria associated with the second area, the processor 202 may remove the second area at the second position or the first area at the first positions such that the updated positions 422 do not include the second position or the first position and the updated areas 424 do not include second position or the second area. Additional details are discussed with respect to FIGS. 5A and 5B.

In some embodiments, the processor 202 may modify the positions 414 and/or the areas 418 to generate the updated positions 422 and/or updated areas 418 such that the updated areas 418 do not overlap and may be displayed simultaneously on the updated timeline visualization 402. For example, to determine the updated positions 422 and/or updated areas 418 may identify that a first area (e.g., corresponding to a first event) at a first position overlaps with a second area (e.g., corresponding to a second event) at a second position. The processor 202 may also determine that the ranking criteria (e.g., property 411) of the first event is the same (e.g., having a similar numerical value) as the second event. As such, instead of removing the first area or the second area, the processor 202 may modify, adjust, or change the first position, the first area, the second position, and/or the second area such that both the first area and the second area may be displayed simultaneously. For example, the processor 202 may reduce at least one dimension of the first area and the second area as discussed in more detail with respect to FIG. 5B. Additionally or alternatively, the processor 202 may generate an updated area 424 that corresponds to both the first event and the second event as discussed in more detail with respect to FIG. 5C.

Continuing with the process 400, the processor 202 may generate (block 246) an updated timeline visualization 402 using the updated positions 422 and/or the updated areas 424 and the timeline parameters 404. In general, the updated timeline visualization 402 may be a timeline visualization 410 where at least a portion of overlapping areas 418 associated with events are removed.

Figure 5A:
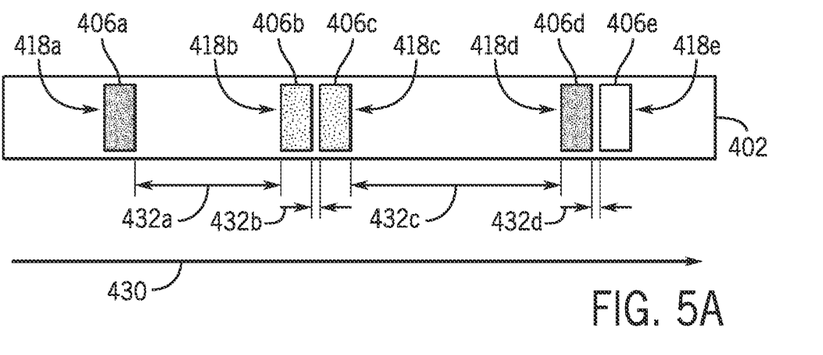
FIG. 5A illustrates first example of a timeline visualization having areas associated with events located at different positions along the timeline visualization, in accordance with aspects of the present disclosure.

To illustrate a timeline visualization (e.g., the updated timeline visualization 402), FIG. 5A illustrates a first example of a timeline visualization 402. In the depicted embodiment of FIG. 5A, the timeline visualization 402 includes five areas 418a, 418b, 418c, 418d, and 418e that represent events 406a, 406b, 406c, 406d, and 406e, respectively. Each of the areas 418a, 418b, 418c, 418d, and 418e are arranged at respective positions along the length 430 of the timeline visualization 402. Additionally, each of the areas 418a, 418b, 418c, 418d, and 418e include a shading, which may correspond to different colors in a real-world implementation. In some embodiments, the shading (e.g., color) may indicate a type of event, strings in data associated with the event, a ranking criteria, such as a severity rating, and the like, associated with the events 406a, 406b, 406c, 406d, and 406e. For example, a darker shading may indicate a higher level of urgency or importance of the respective event 406. As such, the timeline visualizations 402 depicted in FIG. 5A may provide a user with information about a relative occurrence (e.g., a time corresponding to the event 406) and the severity of the events 406a, 406b, 406c, 406d, and 406e. In other embodiments, the ranking criteria may be indicated by a border, a texture, a color, an animation, a flashing effect, or other visual indicators that may differentiate criteria associated with an event. It should be noted that the dimensions of the timeline visualization 402 are meant to be non-limiting, and that the timeline visualization may include other shapes and dimensions.

In the depicted embodiments, the events 406a, 406b, 406c, 406d, and 406e are separated by a distance 432. For example, and as shown, the first event 406a is separated from the second event 406b by a distance 432a (e.g., the first event 406a is centered on a position that is separated from the second event 406b by the distance 432a). Additionally, the second event 406b is separated from the third event 406c by the distance 432b, the third event 406c is separated from the fourth event 406d by the distance 432c, and the fourth event 406d is separated from the fifth event 406e by the distance 432d. As noted above with respect to FIG. 4, the timeline parameters 404 used to generate the timeline visualization (e.g., the timeline visualization 410 and the updated timeline visualization 402) may include a minimum gap size between areas 418 (e.g., corresponding to events). In such embodiments, if the distance (e.g., the gap size) between two areas is below a threshold (e.g., the minimum gap size), the areas 418 may be removed, and thus the timeline visualization 402 may not display the removed areas 418.

Figure 5B:
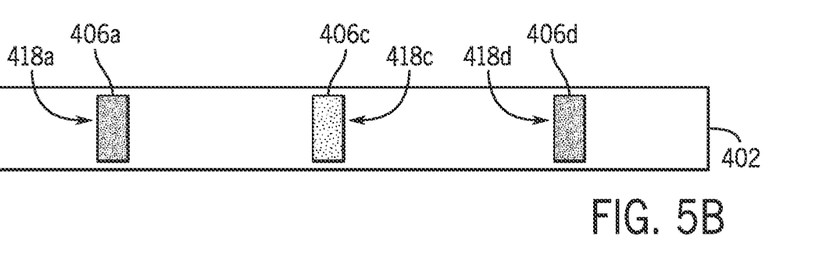
FIG. 5B illustrates a second example of a timeline visualization having one or more areas removed from the timeline visualization of FIG. 5A, in accordance with aspects of the present disclosure.

Keeping the foregoing in mind, FIG. 5B illustrates a second example of a timeline visualization 402 where the timeline parameters 404 of the timeline visualization 402 may specify a minimum gap size that is greater than the distances 432b and 432d, but less than the distances 432a and 432c. Accordingly, the areas 418b and 418e corresponding to the events 406b and 406e may not be displayed in the timeline visualization 402. As such, the areas 418a, 418c, and 418d may correspond to the updated areas 424 described above with respect to FIG. 4.

Additionally, the processor 202 may determine which area 418 to remove based on multiple properties 411 of the events. For example, in response to determining that the area 418b and the area 418c overlap, the processor 202 may compare the severity rating associated with the event 406b and 406c that correspond to the areas 418b and 418c, respectively. If the processor 202 determines that the event 406b has a higher severity rating than the event 406c, the processor 202 may remove the area 418c corresponding to the event 406c (e.g., the updated areas 424 may not include the area 418c). However, if the processor 202 determines that the event 406b and the event 406c have the same severity rating, then the processor 202 may use a different property to determine whether to remove one of the events 406b and 406c from the displayed timeline visualization 402. For example, the processor 202 may remove the event (e.g., the event 406b or 406c) that occurred later in the chronological ordering.

Figure 5C:
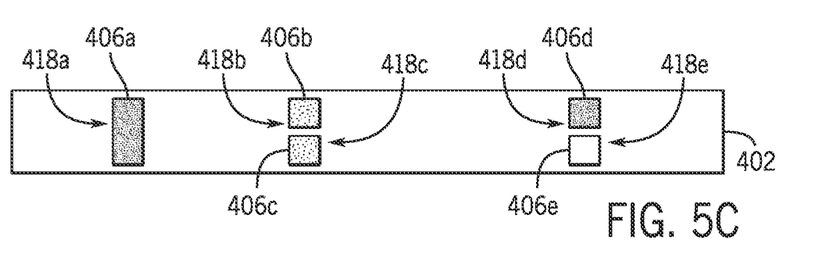
FIG. 5C illustrates a third example of an updated timeline visualization having one or more areas that are vertically arranged based on an overlap of the areas corresponding to events, in accordance with aspects of the present disclosure.

In some embodiments, the processor 202 may display multiple events that overlap. For example, FIG. 5C illustrates a third example of a timeline visualization 402 where overlapping areas 418 are displayed vertically. In the depicted embodiment, the area 418b corresponding to the event 406b is displayed above the area 418c corresponding to the event 406c. Additionally, the area 418d corresponding to the event 406d is displayed above the area 418e corresponding to the event 406e. Continuing with the example above, the arrangement of the areas 418 may be based on the severity rating associated with the events 406 and/or other properties, such as a time corresponding to the events. For example, the processor 202 may determine to display the area 418b above the area 418c because the event 406b corresponding to the area 418b occurred before the event 406c corresponding to the event 406c. Moreover, in the depicted embodiment, the dimensions of the areas 418b, 418c, 418d, and 418e are also modified such that the overlapping areas may be displayed. In some embodiments, one dimension of the areas 418 may be reduced so that one area 418 may be displayed above another area 418. For example, the timeline parameters 402 may include a minimum dimension (e.g., minimum predetermined dimension) that may correspond to a minimum size that may allow a viewer to quickly identify the event 406 corresponding to the area.

As discussed herein, the timeline visualization 402 may indicate patterns between certain events that may be used to inform a user of whether certain tasks are pending or are completed. That is, the reoccurrence of certain events 406 represented by the areas 418 displayed on the timeline visualization 402 may facilitate certain operations, such as determining that a task has not been performed, has or has not been performed in a timely manner, was performed out of order, and so forth. For example, returning briefly to FIG. 5A, the processor 202, may analyze the distance and occurrence of the events and determine that the event 406a corresponding to a call made by a customer is typically followed by the event 406b, which indicates a resolution of the call made by the customer. As such, the processor 202, may identify the event 406d, which may correspond to an additional call made by a customer. Further, the processor 202 may determine that an event corresponding to a resolution of the call associated with the event 406d has not occurred. As such, the processor 202 may alert a user, such as by providing a pop-up notification (e.g., a pop-up window) on the display of the client device 20. In this way, the timeline visualizations 402 may enable monitoring and/or evaluating the status and completion of tasks associated with a record using patterns associated with events 406 displayed on the timeline visualization.

Figure 5D:
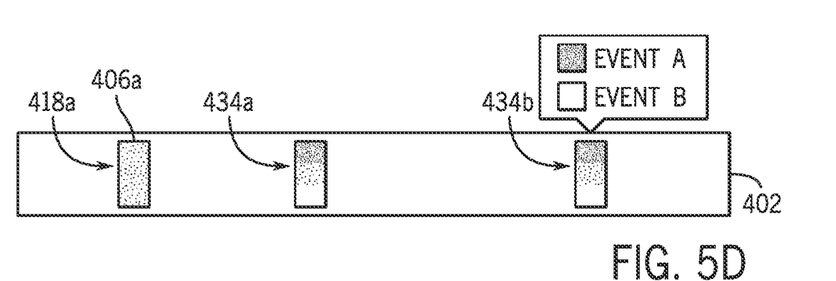
FIG. 5D illustrates a fourth example of an updated timeline visualization having a pop-up visualization of one or more areas based on an overlap of the areas corresponding to events, in accordance with aspects of the present disclosure.

In some embodiments, the processor 202 may display a visualization with an area that indicates there are multiple overlapping events 406. That is, instead of, displaying multiple areas as shown in FIG. 5C, the processor 202 may display a single visualization for an area 418 that indicates two areas 418 were overlapping. For example, FIG. 5D shows two areas 434a and 434b corresponding to multiple events 406 that overlapped. For example, the area 434a may be associated with two events (e.g., the events 406b and 406c discussed with respect to FIG. 5A). Similarly, the area 434b may be associated with two events (e.g., the events 406d and 406e discussed with respect to FIG. 5A). In some embodiments, the processor 202 may generate the areas 434b and/or 434c by modifying (e.g., removing) areas assigned to the respective events. In this way, the timeline visualization 402 may control the amount of information presented to a user (e.g., based on properties of the events 406 and timeline parameters 404) such that the user may only see information considered important by the user.

In the depicted embodiment, the visualization for the areas 434a and 434b is a gradient, which may depict a color, shading, or texture indicate of the properties (e.g., ranking criteria) of each other corresponding events. In some embodiments, the timeline visualization 402 may be configured to generate a pop-up notification (e.g., a pop-up window) that indicates the multiple events (e.g., 'Event A' and 'Event B') that correspond to the area. In this way, the timeline visualization 402 may provide a user an indication that multiple events have occurred and enable the user to look at more granular information (e.g., information related to multiple events) if it is desired by the user.

Figure 6:
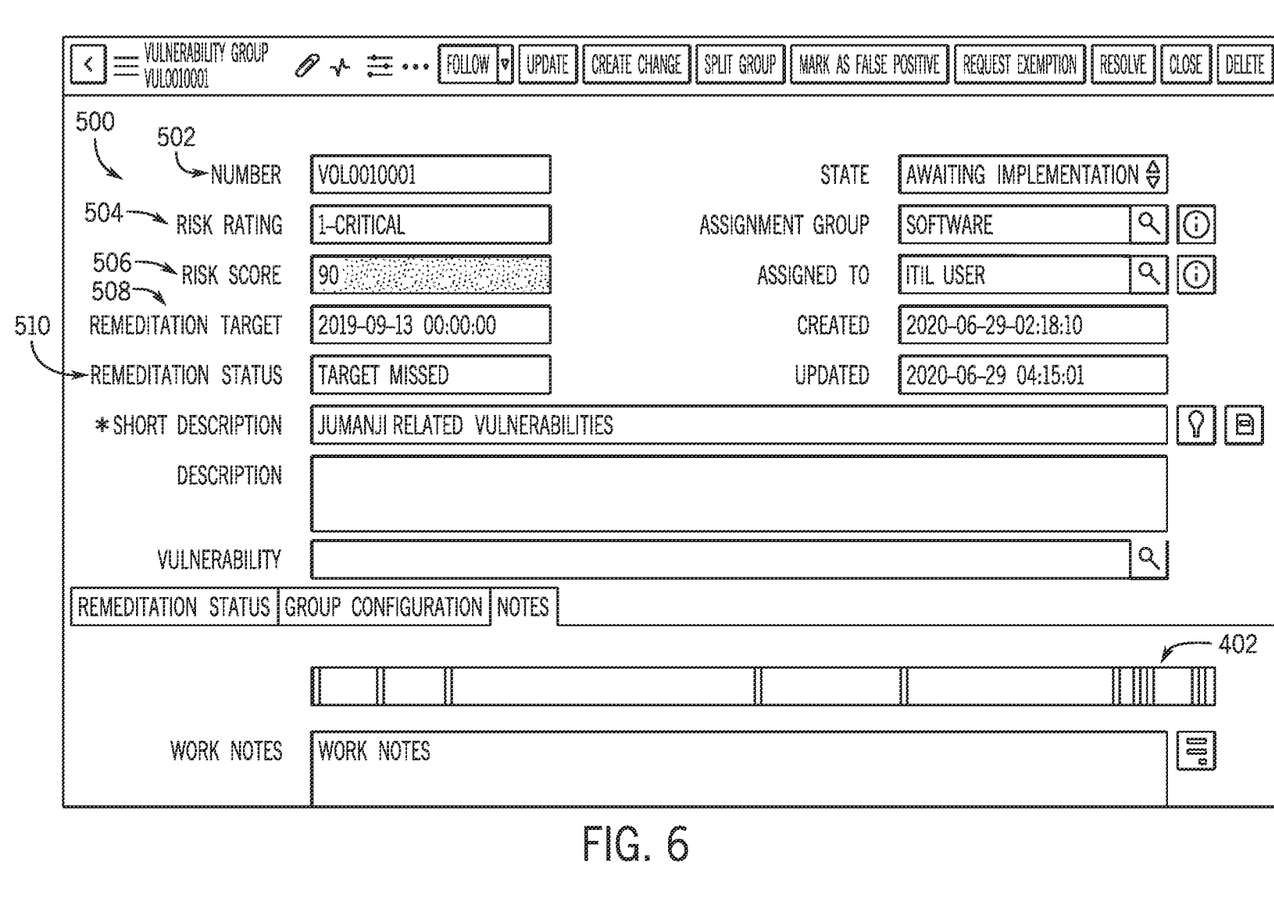
FIG. 6 is a screenshot of an embodiment of a user interface that depicts a user submitted query for a record, in accordance with aspects of the present disclosure.

In some embodiments, the timeline visualization 402 may be generated in response to a user-submitted query for information related to a record. To illustrate this, FIG. 6 shows an interactive window 500 for submitting a request for information related to a record. In general, the interactive window facilitates assembling the timeline visualization by providing multiple input fields 502, 504, 506, 508, 510 (e.g., 'Number', 'Risk Rating', 'Risk Score', 'Remediation Target', 'Remediation Status', 'State', 'Assignment Group', and the like) that enable a user to provide information corresponding to the record as well modify certain timeline parameters 404, such as the ranking criteria (e.g., 'Risk Rating' and 'Risk Score'). For example, a numerical input into the 'Risk Score' input field may modify the minimum 'Risk Score' to display on the timeline visualization 402. As such, the timeline visualization 402 may display events 406 having a risk rating (e.g., a property 411 of the event 406) greater than or equal to the numerical input into the 'Risk Score' field. In this way, the interactive window 500 may enable a user to select which events to display on the timeline visualization based on timeline parameters 404 and/or properties 411 provided as input by the user.

Figure 7:
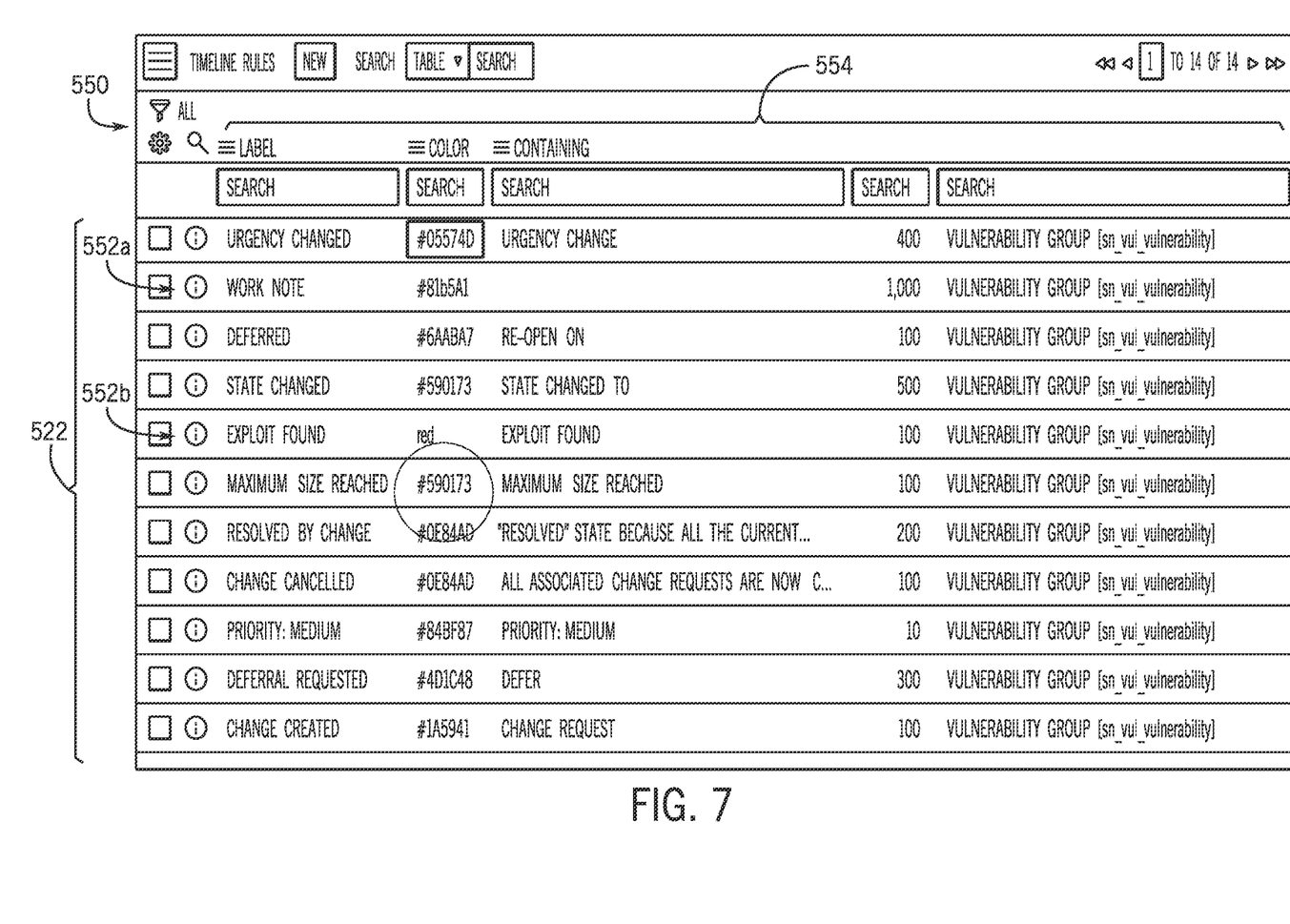
FIG. 7 is a screenshot of an embodiment of a user interface that depicts a table storing rules used to generate the timeline visualization of FIG. 4, in accordance with aspects of the present disclosure.

In some embodiments, the events 406 displayed on the timeline visualization 402 may be selected based on logic or rules. To illustrate this, FIG. 7 shows table 550 displaying rows 552 corresponding to different properties (e.g., properties 411 as described above with respect to FIG. 4). Each property of the rows 552 includes fields 554 that generally indicates how a property may be used to generate the timeline visualization 402. For example, in the depicted embodiment, the fields 554 for the row 552 associated with a 'work note' indicate a 'color' (e.g., the hexadecimal code) that may be used for generating a visualization of the event 406 having the property of a 'work note.' Additionally, the fields 442 may indicate keywords that the processor 202 may query upon to receiving an event 406 to determine whether the event corresponds to a 'work note.'' For example, the processor 202 may determine an event 406 that includes the phrase 'urgency change' has the property of a 'work note.' Further, the fields may indicate the ranking criteria (e.g., the 'order'), which may be used by the processor 202 for certain operations described herein, such as determining whether to display event based on its ranking criteria, determining whether to remove a first area or a second area that are overlapping based on the ranking criteria, and the like. For example, an event 406 having the property of 'Exploit found' (e.g., corresponding to row 552b) assigned to a first area that overlaps with a second area assigned to an event 406 having the property 'work note' may be removed from the timeline visualization 402 because the ranking criteria of the event 406 having the property corresponding to the row 552b is a higher ranking than the ranking criteria of the event 406 having the property corresponding to row 552a. In this way, a user may control the logic or rules for generating a timeline visualization 402 by providing the criteria discussed above.

Accordingly, the present disclosure relates generating a timeline visualization to enable users to more quickly find information and limit the amount of displayed information associated with the record. The timeline visualization may illustrate or display events associated with a record as areas that are positioned (e.g., longitudinally) along the timeline visualization. In some embodiments, the timeline visualization may be generated using timeline parameters, such as the dimensions of the areas corresponding to the events, the dimensions of the timeline, and certain properties of the events, such as ranking criteria (e.g., a severity of the event), that limits the type of events that may be displayed as areas on the timeline visualization. In some embodiments, the timeline visualization may indicate patterns between certain events that may be used to inform a user of whether certain tasks are pending or are completed. In this way, generating a timeline visualization that displays areas corresponding to events and fixing certain timeline parameters may improve the efficiency of users managing records.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   one or more remote client networks; and
   a client device configured to communicate with the one or more remote client networks, wherein the client device is configured to communicate with the one or more remote client networks to perform operations comprising:
      receiving one or more timeline parameters;
      generating a timeline visualization based on the one or more timeline parameters;
      receiving a plurality of events to be depicted on the timeline visualization, wherein each event comprises one or more properties;
      identifying a plurality of positions on timeline visualization to assign to the plurality of events based on the one or more timeline parameters;
      assigning a plurality of areas to the plurality of positions such that each area of the plurality of areas is associated with an event of the plurality of events;
      determining that a first area of the plurality of areas associated with a first event overlaps with a second area of the plurality of areas associated with a second event on the timeline visualization;
      modifying the first area, the second area, or both in response to determining that the first area overlaps with the second area and based on the one or more properties of the first event and the one or more properties of the second event; and
      generating an updated timeline visualization using the modified first area, the modified second area, or both.

2. The system of claim 1, wherein the operation to modify first area, the second area, or both in response to determining that the first area overlaps with the second area comprises:
   determining that a first property of the one or more properties of the first event does not match at least one of the one or more timeline parameters; and
   generating the updated timeline visualization without using the first area in response to determining the first property does not match at least one of the one or more timeline parameters.

3. The system of claim 1, wherein a respective property of the one or more properties is indicative of a severity, a type of event, or both.

4. The system of claim 1, wherein the timeline parameters comprise one or more of a maximum size of the timeline visualization, a minimum gap size between events, a maximum gap size between events, or a maximum area.

5. The system of claim 1, wherein the timeline parameters comprise a minimum gap size between events, and wherein the operation to determine that the first area overlaps with the second area comprises:
   determining a distance between a first position of the first area and a second position of the second area is less than the minimum gap size; and
   generating the updated timeline visualization without using the first area in response to determining the distance between the first position and the second position is less than the minimum gap size.

6. The system of claim 1, wherein the operation to modify first area, the second area, or both in response to determining that the first area overlaps with the second area comprises:
   generating an updated area using the first area and the second area, wherein the updated area is associated with the first event and the second event; and
   generating the updated timeline visualization using the updated area.

7. The system of claim 1, wherein the operation to modify first area, the second area, or both in response to determining that the first area overlaps with the second area comprises:
   reducing one or more dimensions of the first area and second area; and
   generating the updated timeline visualization that includes the first area and the second area with the reduced one or more dimensions.

8. The system of claim 1, wherein the one or more properties of the events comprise a ranking criteria.

9. A method, comprising:
   receiving one or more timeline parameters;
   generating a timeline visualization based on the one or more timeline parameters;
   receiving a plurality of events to be depicted on the timeline visualization, wherein each event of the plurality of events comprises one or more properties;
   identifying a plurality of positions on timeline visualization for the plurality of events based on the one or more timeline parameters;
   assigning a plurality of areas to the plurality of position such that each area is associated with an event of the plurality of events;

determining that a first area of the plurality of areas associated with a first event overlaps with a second area of the plurality of areas associated with a second event on the timeline visualization;

removing the first area from the timeline visualization based on the one or more properties of the first event and the one or more properties of the second event and in response to determining that the first area overlaps with the second area; and generating an updated timeline visualization using the timeline visualization with the first area or the second area removed.

10. The method of claim 9, wherein removing the first area from the timeline visualization based on the one or more properties of the first event and the one or more properties of the second event comprises:

determining a first property of the one or more properties of the first event does not match at least one of the one or more timeline parameters; and removing the first area in response to determining the first property does not match at least one or more one or more timeline parameters.

11. The method of claim 9, wherein the one or more properties of the first event comprise a first ranking criteria, the one or more properties of the second event comprise a second ranking criteria, and wherein removing the first area from the timeline visualization based on the one or more properties of the first event and the one or more properties of the second event comprises:

determining the second ranking criteria indicates a higher ranking than the first ranking criteria; and removing the first area from the timeline visualization in response to determining the second ranking criteria indicates a higher ranking than the first ranking criteria.

12. The method of claim 9, wherein removing the first area from the timeline visualization based on the one or more properties of the first event and the one or more properties of the second event comprises:

associating the first event with the second area; and removing the first area in response to associating the first event with the second area.

13. The method of claim 9, wherein the timeline visualization comprises the plurality of positions, and wherein the plurality of positions correspond to predefined time ranges based on the one or more timeline parameters.

14. The method of claim 9, wherein one or more timeline parameters comprise one or more of a maximum size of the timeline visualization, a minimum gap size between events, a maximum gap size between events, or a maximum area.

15. The method of claim 9, comprising displaying a pop-up window associated with the second area, wherein the pop-up window comprises information associated with the first event and the second event.

16. A tangible, non-transitory, machine-readable medium, comprising machine-readable instructions, wherein the machine-readable instructions, when executed by one or more processors cause the one or more processors to:

receive a request for a timeline visualization associated with a record;

identify one or more timeline parameters associated with the timeline visualization;

identify a plurality of events associated with the record based on the one or more timeline parameters and one or more properties of each event of the plurality of events;

identify a plurality of positions on the timeline visualization for the plurality of events based on the one or more timeline parameters;

assign a plurality of areas to the plurality of position such that each area is associated with an event of the plurality of events;

determine that a first area of the plurality of areas associated with a first event overlaps with a second area of the plurality of areas associated with a second event on the timeline visualization;

remove the first area from the identifying plurality of events to generate an updated plurality of events; and generate the timeline visualization using the updated plurality of events.

17. The tangible, non-transitory, machine-readable medium of claim 16, wherein the instructions to identify the plurality of events associated with the record based on the one or more timeline parameters and the one or more properties of each event of the plurality of events comprise determining whether the one or more properties match to the one or more timeline parameters.

18. The tangible, non-transitory, machine-readable medium of claim 16, wherein the one or more timeline parameters comprise a predetermined dimension for the plurality of areas.

19. The tangible, non-transitory, machine-readable medium of claim 16, wherein the one or more timeline parameters comprise a predetermined dimension for the timeline visualization.

20. The tangible, non-transitory, machine-readable medium of claim 16, wherein the one or more properties of the events comprise a ranking criteria.

* * * * *